United States Patent [19]

Ogawa et al.

[11] Patent Number: 5,237,551
[45] Date of Patent: Aug. 17, 1993

[54] APPARATUS MEASURING AN OUTPUT OF A DISK DRIVE

[75] Inventors: Takashi Ogawa, Yokohama; Tetsuo Kanno, Ebina; Yoshiaki Aota, Oyaguchi-Kita; Yuji Kitamura, Yokohama, all of Japan

[73] Assignee: Ricoh Company, Ltd., Tokyo, Japan

[21] Appl. No.: 743,090

[22] Filed: Aug. 9, 1991

[30] Foreign Application Priority Data

Aug. 20, 1990 [JP] Japan .................................. 2-217127
Nov. 28, 1990 [JP] Japan .................................. 2-322440

[51] Int. Cl.⁵ ............................................. G11B 33/10
[52] U.S. Cl. ...................................................... 369/54
[58] Field of Search ................ 369/53, 54, 58, 116; 358/139; 334/601; 73/1 J; 364/579, 580

[56] References Cited

U.S. PATENT DOCUMENTS 4,504,871  3/1985  Berwick et al. ...................... 360/137
5,159,182 10/1992  Eisele .................................. 235/492

OTHER PUBLICATIONS

Parts Express International Inc. Catalog, Copyright Mar. 1990, Last Page (Back Cover).

Primary Examiner—Donald E. McElheny, Jr.
Attorney, Agent, or Firm—Cooper & Dunham

[57] ABSTRACT

An apparatus for measuring an optical output of an optical pickup device disposed in an optical disk drive unit has a dummy cartridge approximately of the same type as a disk cartridge mounted to the optical disk drive unit; a light-receiving element disposed in a predetermined position of the dummy cartridge; an optical level measuring display device for inputting the light-receiving signal thereto and displaying a measured value of the optical output; and a controller for controlling an operation of the optical disk drive unit such that this optical disk drive unit performs a predetermined operation for measuring the optical output. The above measuring apparatus may further comprise a connector device for externally outputting the light-receiving signal of the light-receiving element. In this case, the optical level measuring display device inputs the light-receiving signal thereto through the connector device. An apparatus for measuring a magnetic field distribution of a magnetic head disposed in a magnetooptic disk drive unit and generating an auxiliary magnetic field is also shown.

20 Claims, 7 Drawing Sheets

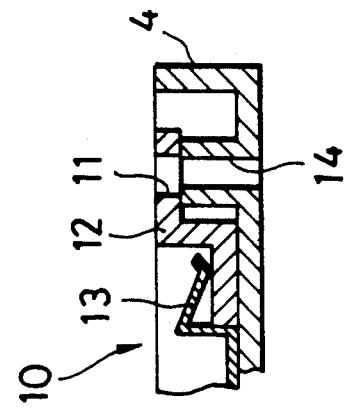
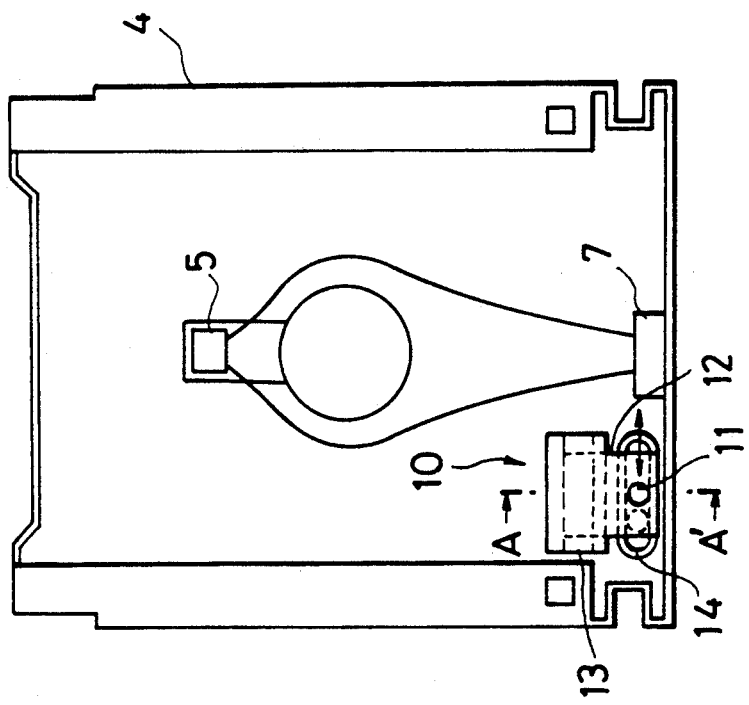

APPARATUS MEASURING AN OUTPUT OF A DISK DRIVE

BACKGROUND OF THE INVENTION

1. Field of the Invention

The present invention relates to an apparatus for measuring an optical output of an optical pickup device disposed in an optical disk drive unit, or a magnetic field distribution of a magnetic head for generating an auxiliary magnetic field disposed in a magnetooptic disk drive unit.

2. Description of the Related Art

For example, in an optical pickup device used to record data to an optical disk drive device and reproduce these data therefrom, the optical pickup device is adjusted in operation at a forwarding time thereof from a factory such that a quantity level of a laser beam outputted at recording and reproducing times of the data is equal to a predetermined level.

It is therefore necessary to detect an optical output of the optical pickup device so as to adjust this optical output. In general, the optical output of the optical pickup device is measured by the following methods having some problems.

In a first measuring method of the optical output, it is troublesome to disassemble a optical disk drive unit so as to measure the optical output. It is difficult to provide a reliable measured value of the optical output since there is great dispersion in a measuring position of the optical output. Further, it is necessary to pay attention to the removal of an influence of disturbance light around the optical disk drive unit.

In a second measuring method of the optical output, a jig is attached to a turn table so as to measure the optical output. However, the jig is unstably attached to the turn table so that it is difficult to provide a reliable measured value of the optical output.

In a general method for measuring the intensity of a magnetic field, no intensity of the magnetic field is measured in a state in which magnetic head is really attached to a magnetooptic disk drive device. Accordingly, measured results of the intensity of the magnetic field are uncertain and a measuring operation of this magnetic field intensity is troublesome.

SUMMARY OF THE INVENTION

It is therefore an object of the present invention to provide an apparatus for simply measuring the optical output of an optical pickup device and the magnetic field distribution of a magnetic head, and providing reliable measured values of the optical output and the magnetic field distribution.

The above object of the present invention can be achieved by an apparatus for measuring an optical output of an optical pickup device disposed in an optical disk drive unit, the measuring apparatus comprising a dummy cartridge approximately of the same type as a disk cartridge mounted to the optical disk drive unit; a light-receiving element disposed in a predetermined position of the dummy cartridge; optical level measuring display means for inputting the light-receiving signal thereto and displaying a measured value of the optical output; and means for controlling an operation of the optical disk drive unit such that this optical disk drive unit performs a predetermined operation for measuring the optical output.

The above object of the present invention can be also achieved by an apparatus for measuring an optical output of an optical pickup device disposed in an optical disk drive unit, the measuring apparatus comprising a dummy cartridge approximately of the same type as a disk cartridge mounted to the optical disk drive unit; a light-receiving element disposed in a predetermined position of the dummy cartridge; connector means for externally outputting a light-receiving signal of the light-receiving element; optical level measuring display means for inputting the light-receiving signal thereto through the connector means and displaying a measured value of the optical output; and means for controlling an operation of the optical disk drive unit such that this optical disk drive unit performs a predetermined operation for measuring the optical output.

The above object of the present invention can be also achieved by an apparatus for measuring a magnetic field distribution of a magnetic head disposed in a magnetooptic disk drive unit and generating an auxiliary magnetic field, the measuring apparatus comprising a dummy cartridge approximately of the same type as a disk cartridge mounted to the magnetooptic disk drive unit; at least one magnetic field detecting element disposed in a predetermined position of the dummy cartridge and detecting the magnetic field; magnetic field measuring display means for inputting the detecting signal thereto and displaying a measured value of the magnetic field; and means for controlling an operation of the magnetooptic disk drive unit such that this magnetooptic disk drive unit performs a predetermined operation for measuring the magnetic field.

The above object of the present invention can be also achieved by an apparatus for measuring a magnetic field distribution of a magnetic head disposed in a magnetooptic disk drive unit and generating an auxiliary magnetic field, the measuring apparatus comprising a dummy cartridge approximately of the same type as a disk cartridge mounted to the magnetooptic disk drive unit; at least one magnetic field detecting element disposed in a predetermined position of the dummy cartridge and detecting the magnetic field; connector means for externally outputting a detecting signal of the magnetic field detecting element; magnetic field measuring display means for inputting the detecting signal thereto through the connector means and displaying a measured value of the magnetic field; and means for controlling an operation of the magnetooptic disk drive unit such that this magnetooptic disk drive unit performs a predetermined operation for measuring the magnetic field.

In accordance with the above structures, the measuring operation of the measuring apparatus is very simplified since a sensor for measuring the optical output and the magnetic field is attached to the measuring apparatus by mounting the dummy cartridge thereto. Further, it is not necessary to disassemble the optical disk drive unit to perform the measuring operation. Accordingly, it is possible to reduce the number of operations at a measuring time of the measuring apparatus. Further, it is possible to provide reliable measured values of the optical output and the magnetic field since no operation of the measuring apparatus is influenced by disturbance light, etc. Further, the magnetic field distribution can be measured in a state in which the magnetic head is attached to the magnetooptic disk drive unit. Accordingly, it is possible to provide reliable measured results of the magnetic field distribution.

Further objects and advantages of the present invention will be apparent from the following description of the preferred embodiments of the present invention as illustrated in the accompanying drawings.

BRIEF DESCRIPTION OF THE DRAWINGS

FIG. 5a is a schematic plan view showing one example of a mechanism for changing a media sensor mark;

FIG. 5b is a cross-sectional view taken along line A—A' of FIG. 5a;

DESCRIPTION OF THE PREFERRED EMBODIMENTS

The preferred embodiments of a measuring apparatus in the present invention will next be described in detail with reference to the accompanying drawings.

Figure 1:
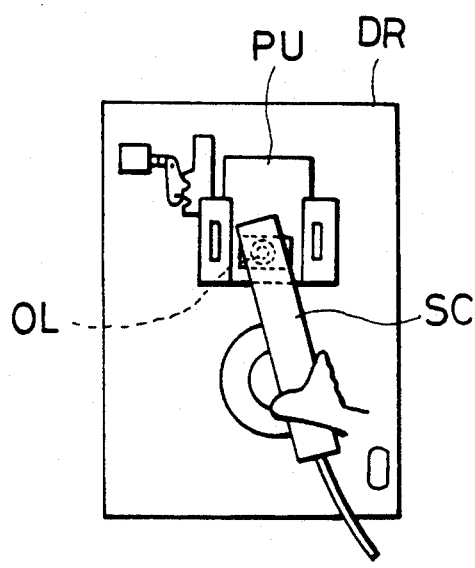
FIG. 1 is a schematic view showing one example of a general method for measuring an optical output.

As shown in FIG. 1, an optical disk drive unit DR is disassembled to directly treat an optical pickup device PU manually. A sensor SC disposed in an unillustrated optical output meter is manually positioned on an objective lens OL disposed in the optical pickup device PU.

The optical pickup device PU is then turned on to read a measured value of the optical output meter, thereby measuring an optical output of the optical pickup device PU.

Figure 2:
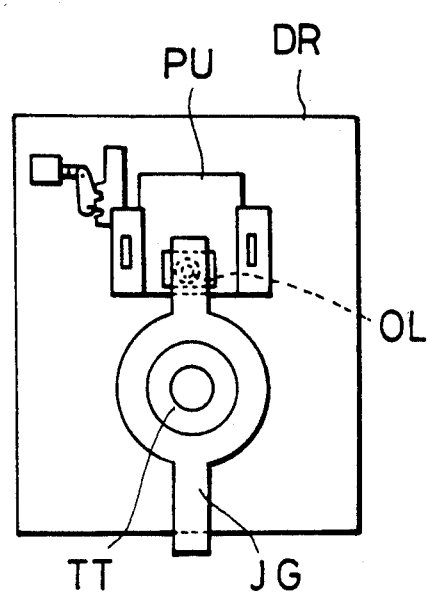
FIG. 2 is a schematic view showing another example of the general method for measuring an optical output.

As shown in FIG. 2, another optical disk drive unit uses a jig JG for positioning the sensor SC of the optical output meter in a predetermined position in a state in which the jig JG is fixed to a turn table TT attached to a spindle motor.

In a magnetooptic disk drive device in which data can be erased, it is necessary to adjust an optical output of an optical pickup device and further detect that the intensity of a magnetic field of a magnetic head for generating an auxiliary magnetic field at recording and erasing times of data is set at a level required to record and erase the data.

Figure 3:
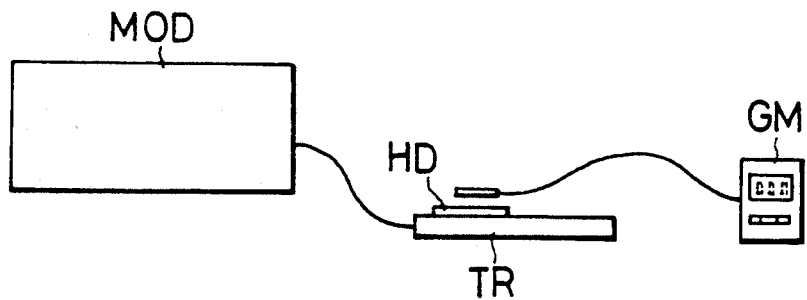
FIG. 3 is a schematic view showing an example of a general method for measuring a magnetic field.

FIG. 3 shows an example of a method for measuring the intensity of a magnetic field of this magnetic head. As shown in FIG. 3, a tray TR having a magnetic head HD thereon is pulled out of a magnetooptic disk drive device MOD. The magnetic head HD is operated by controlling an operation of the magnetooptic disk drive device MOD such that this magnetooptic disk drive device MOD is in data recording/erasing states. Thus, the intensity of the magnetic field is measured by using a Gauss meter GM.

However, such a general measuring method has the following disadvantages.

In the former optical disk drive unit DR using the measuring method of an optical output and shown in FIG. 1, it is troublesome to disassemble the optical disk drive unit DR. It is difficult to provide a reliable measured value of the optical output since there is great dispersion in a measuring position of the optical output. Further, it is necessary to pay attention to the removal of an influence of disturbance light around the optical disk drive unit.

In the latter optical disk drive unit using the measuring method of an optical output and shown in FIG. 2, the jig JG is unstably attached to the turn table TT so that it is difficult to provide a reliable measured value of the optical output.

In the above general method for measuring the intensity of a magnetic field, no intensity of the magnetic field is measured in a state in which the magnetic head is really attached to the magnetooptic disk drive device. Accordingly, measured results of the intensity of the magnetic field are uncertain and a measuring operation of this intensity is troublesome.

Figure 4:
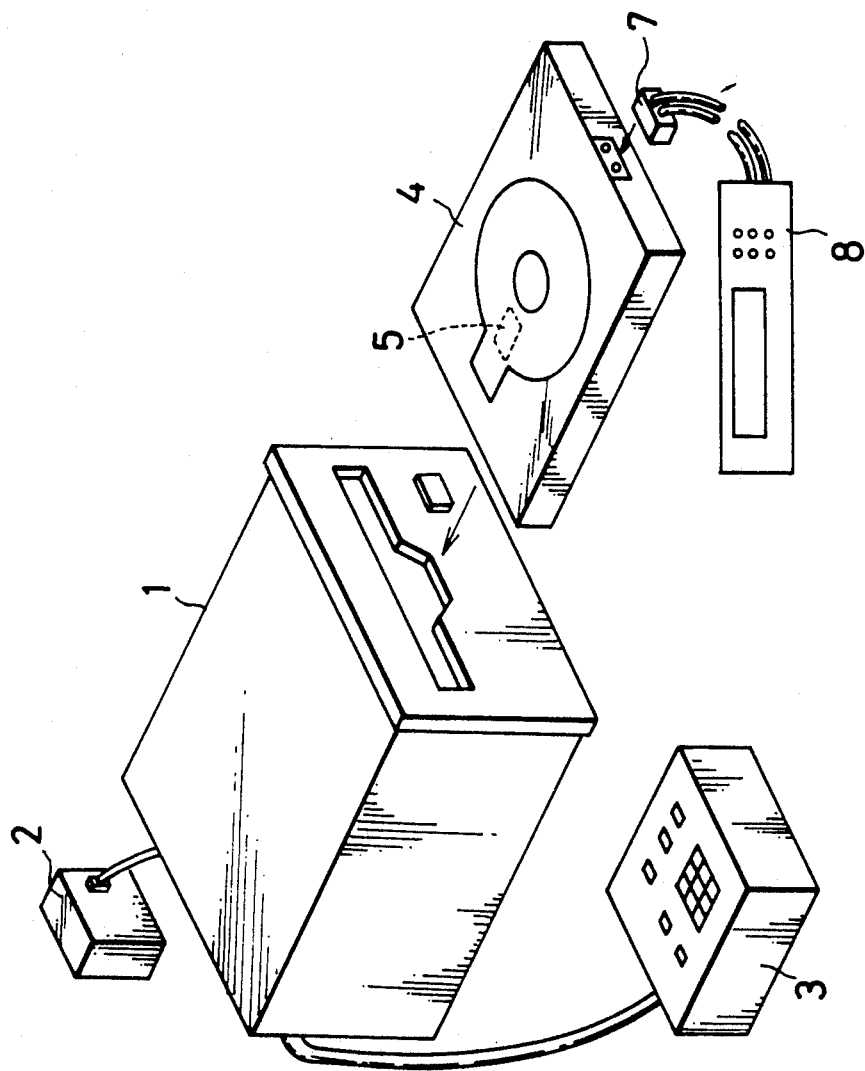
FIG. 4 is a schematic perspective view showing an apparatus for measuring an optical output in accordance with one embodiment of the present invention.

FIG. 4 shows an apparatus for measuring an optical output in accordance with one embodiment of the present invention.

In FIG. 4, an optical disk drive unit 1 is used in an optical disk drive device of a write-once type and power is supplied to this optical disk drive unit 1 by a power unit 2. A control unit 3 for controlling an operation of the optical disk drive unit 1 is connected to this optical disk drive unit 1.

A disk cartridge has an optical disk of a write-once type used as a recording medium in the optical disk drive unit 1. A dummy cartridge 4 is approximately of the same type as this disk cartridge. A bottom face of this dummy cartridge 4 is opened. A light-receiving element 5 is disposed in a position corresponding to a home position of the dummy cartridge 4 and receives output light of an unillustrated optical pickup device described later. An output of this light-receiving element 5 is transmitted through a connector 7 to an optical output meter 8 for measuring an optical output of the optical pickup device.

As shown in FIGS. 5a and 5b, a media changing mechanism 10 is disposed in the dummy cartridge 4 such that the measuring apparatus in the present invention can be applied to a magnetooptic disk drive unit having the same shape with respect to the used disk cartridge. This media changing mechanism 10 can change a media sensor mark for designating the kind of media.

The media changing mechanism 10 is constructed by a sliding plate 12, a leaf spring 13 and an elongated hole 14. The sliding plate 12 has a hole 11 constituting the media sensor mark and is movably attached to the dummy cartridge 4 in a changing direction of the media sensor mark. The leaf spring 13 is disposed to hold this sliding plate 12 by the dummy cartridge 4. The elongated hole 14 is disposed in the dummy cartridge so as to detect the media sensor mark.

When the hole 11 is located as shown by a solid line in FIG. 5a, the media sensor mark can be constructed by the same mark as the disk cartridge having the optical disk of a write-once type therein. In contrast to this, when the hole 11 is located as shown by a broken line in FIG. 5a, the media mark of the optical disk of a write-once type can be located in a closed position. Accordingly, the media sensor mark can be constructed by the same mark as the disk cartridge having a magnetooptic disk therein.

Figure 6:
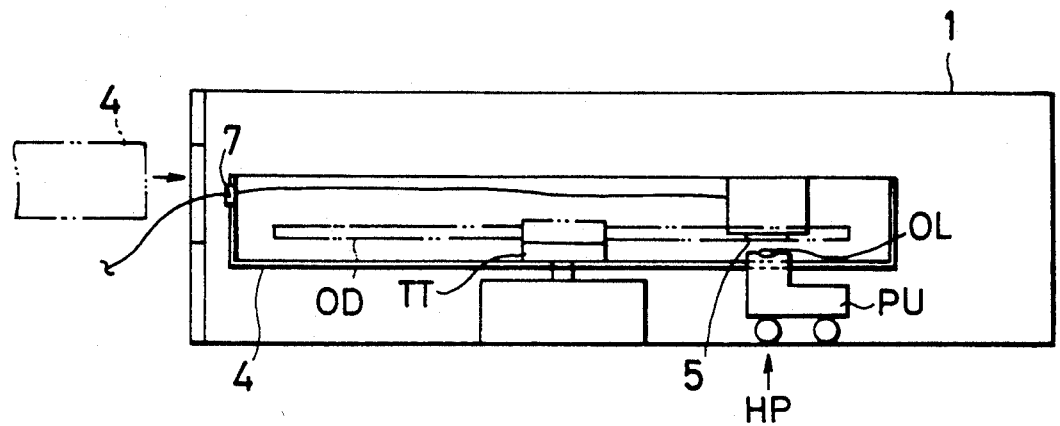
FIG. 6 is a schematic partial cross-sectional view for explaining an optical output measuring operation of an optical pickup device.

In the above structure, when an operator inserts the dummy cartridge 4 into the optical disk drive unit 1 as shown in FIG. 6, the dummy cartridge 4 is positioned by an unillustrated loading mechanism in a predetermined position of the optical disk drive unit 1.

In this state, a light-receiving face of the light-receiving element 5 is located at the same height as a recording face of the optical disk OD of a write-once type fixed to a turn table TT when the disk cartridge is mounted to the optical disk drive unit 1. The light-receiving element 5 is located just above a home position HP as a standby position of the optical pickup device PU.

In this state, the operator first operates the control unit 3 such that a command for moving the optical pickup device PU to the home position HP is outputted to the optical disk drive unit 1.

Thus, the optical pickup device PU is moved to the home position HP in the optical disk drive unit 1. When the optical pickup device PU is completely moved to the home position HP, information indicative of this completing state is transmitted to the control unit 3.

The control unit 3 displays that the optical pickup device PU is completely moved to the home position HP, thereby informing the operator of this completing state.

The operator next operates the control unit 3 such that a command for emitting light from the optical pickup device PU at a light quantity level at a reproducing time thereof is outputted to the optical disk drive unit 1.

Thus, in the optical disk drive unit 1, light is emitted from the optical pickup device PU at the light quantity level at the reproducing time thereof. The light emitted from the optical pickup device PU is received by the light-receiving element 5. A light-receiving signal of the light-receiving element 5 corresponding to a light-receiving amount thereof is outputted to the optical output meter 8. The light-receiving amount is displayed by the optical output meter 8.

Thus, the operator judges the light quantity level of the optical pickup device PU at the reproducing time thereof from the display of the optical output meter 8.

The operator next operates the control unit 3 such that a command for emitting light from the optical pickup device PU at a light quantity level at a recording time thereof is outputted to the optical disk drive unit 1.

Thus, in the optical disk drive unit 1, light is emitted from the optical pickup device PU at the light quantity level at the recording time thereof. Similar to the above case, a light-receiving amount of the light-receiving element 5 corresponding to the light-emitting amount of the optical pickup device is displayed by the optical output meter 8.

Thus, the operator judges the light quantity level of the optical pickup device PU at the recording time thereof from the display of the optical output meter 8.

When the operator judges the light quantity levels of the optical pickup device PU at the reproducing and recording times thereof, the operator adjusts an output level of the optical pickup device PU such that this output level is equal to a predetermined level by a well-known adjusting operation in accordance with the light quantity values.

As mentioned above, in this embodiment, the optical output level of the optical pickup device PU can be measured by a very simple operation, thereby greatly improving operability at the adjusting time of the optical disk drive unit.

Further, the optical output level of the optical pickup device PU can be measured without disassembling the optical disk drive unit 1. Therefore, it is possible to provide a reliable measured value of the optical output level without any influence of disturbance light.

Figure 7:
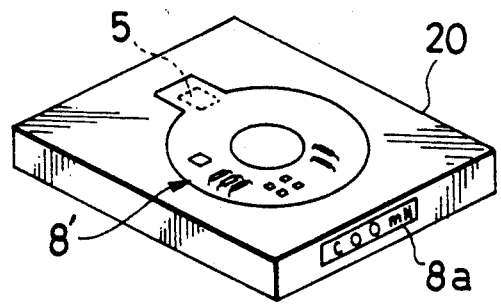
FIG. 7 is a schematic perspective view showing another example of a dummy cartridge used in the measuring apparatus of the present invention.

FIG. 7 shows another example of the dummy cartridge in the present invention.

This dummy cartridge 20 has a light-receiving element 5 and a circuit element 8' of an optical output meter 8. The dummy cartridge 20 has a display device 8a for displaying a measured value of the optical output level. The display device 8a is disposed in an end portion of the dummy cartridge 20 which can be seen from the exterior of the optical disk drive unit 1 when the dummy cartridge 20 is mounted to the optical disk drive unit 1.

A display screen of the display device 8a is inclined at a certain angle of elevation such that the display of the display device 8a can be easily seen from the exterior of the optical disk drive unit in a state in which the dummy cartridge 20 is mounted to the optical disk drive unit 1.

In a certain optical disk drive unit 1, the home position HP is set to a position different from the home position shown in FIG. 6.

Figure 8A:
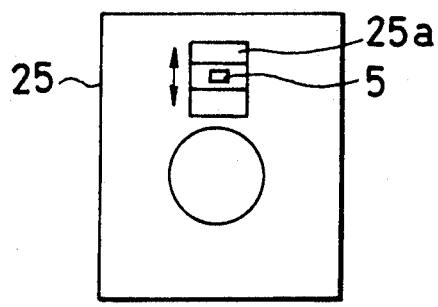
FIG. 8a is a schematic front view showing another example of the dummy cartridge used in the measuring apparatus of the present invention.
Figure 8B:
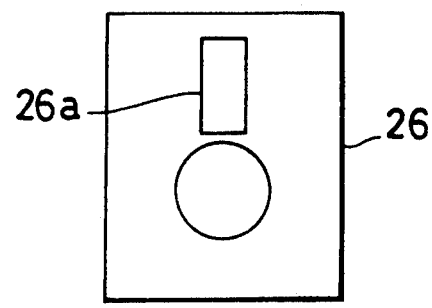
FIG. 8b is a schematic front view showing another example of the dummy cartridge used in the measuring apparatus of the present invention.

Each of dummy cartridges 25 and 26 shown in FIGS. 8a and 8b as another example of the dummy cartridge can be applied to such an optical disk drive unit 1.

The dummy cartridge 25 is disposed in a sliding mechanism 25a moved in a radial direction of the optical disk of a write-once type such that an attachment position of the light-receiving element 5 is in conformity with the home position HP of the optical pickup device PU.

The sliding mechanism 25a is operated such that the attachment position of the light-receiving element 5 is in conformity with the home position HP of the optical disk drive unit 1 for measuring an optical output of the optical pickup device PU. Accordingly, it is possible to detect an optical output level of the optical pickup device PU in the optical disk drive unit 1 of a different kind by using the above dummy cartridge 25.

A light-receiving element 26a is disposed in the dummy cartridge 26. A size of the light-receiving element 26a in a radial direction of the optical disk of a write-once type is set to be slightly larger than an effective recording range of the optical disk of a write-once type.

In this case, the light-receiving element 26a can receive output light of the optical pickup device PU in any position thereof in the effective recording range of the optical disk. Accordingly, it is sufficient to mount the dummy cartridge 26 to the optical disk drive unit so that it is not necessary to move the optical pickup device PU to the home position HP.

Figure 9:
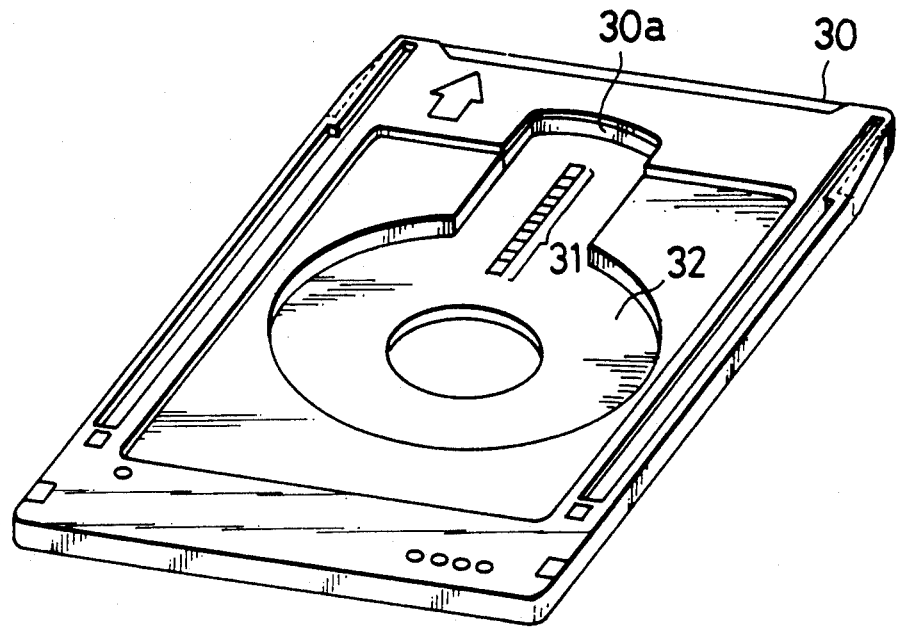
FIG. 9 is a schematic perspective view showing another example of the dummy cartridge used in the measuring apparatus of the present invention.
Figure 10:
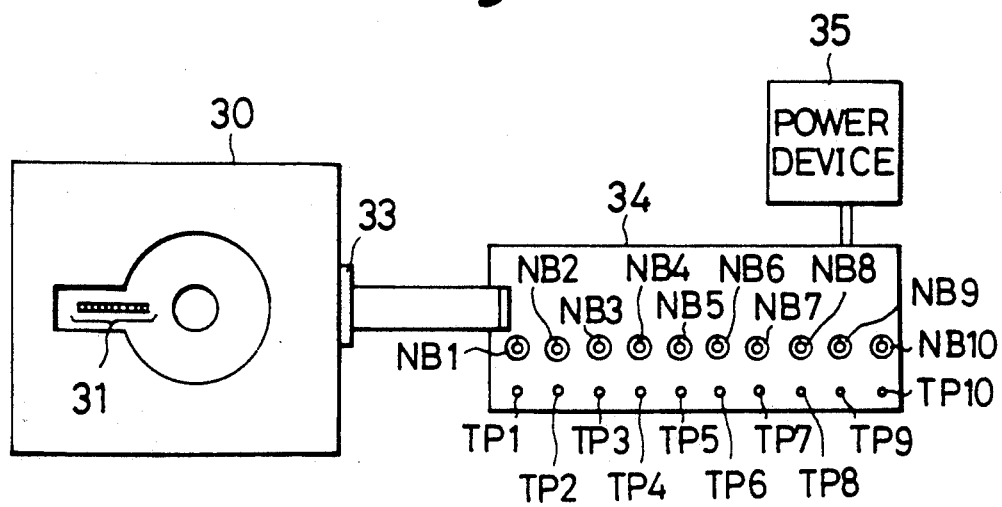
FIG. 10 is a schematic view showing an apparatus for measuring a magnetic field in accordance with another embodiment of the present invention.

FIGS. 9 and 10 show one example of a magnetic field measuring apparatus for measuring a magnetic field distribution of a magnetic head for generating an auxiliary magnetic field at recording/erasing times of data in a magnetooptic disk drive device.

In these figures, a disk cartridge has a magnetooptic disk used as a memory medium in an unillustrated magnetooptic disk drive device. A dummy cartridge 30 is approximately of the same type as this disk cartridge. An upper face of this dummy cartridge 30 is opened. A Hall element array 31 is disposed in a position of the dummy cartridge 30 corresponding to a measuring range of the distribution of a magnetic field of the magnetic head described later. The Hall element array 31 is formed by arranging a plurality of Hall elements for detecting the above magnetic field. In this embodiment, the Hall element array 31 is formed by arranging ten Hall elements HS1 to HS10 as shown in FIG. 11.

This Hall element array 31 is attached to a circuit substrate 32 approximately having the same shape as an opening portion 30a of the dummy cartridge 30. A detecting signal of the Hall element array 31 is transmitted through a connector cable 33 to a measuring device 34 for measuring the intensity of a magnetic field of the magnetic head.

The measuring device 34 has thumbscrews NB1 to NB10 of variable resistors for correcting outputs of the respective Hall elements HS1 to HS10 of the Hall element array 31. Test pins TP1 to TP10 for outputting detecting signals of the respective Hall elements HS1 to HS10 are arranged just below the respective thumbscrews NB1 to NB10. A power device 35 is disposed to supply power to the measuring device 34 and the Hall element array 31.

Figure 11:
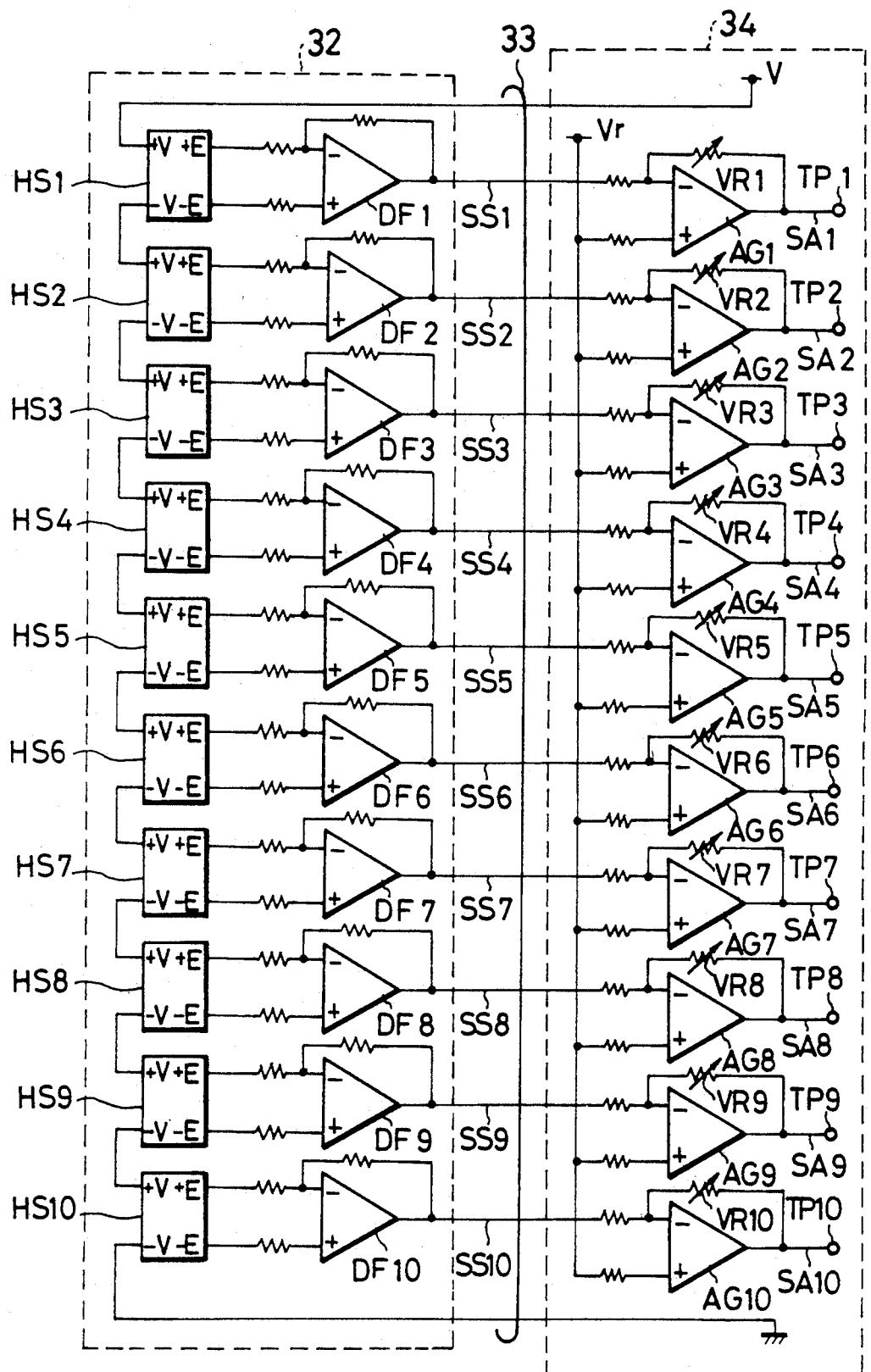
FIG. 11 is a view showing one example of a circuit structure constituting the magnetic field measuring apparatus.

FIG. 11 shows an example of a circuit structure constituting the magnetic field measuring apparatus.

In FIG. 11, power terminals $-V$ of the Hall elements HS1 to HS10 on minus sides thereof are connected in series to power terminals $+V$ of these Hall elements on plus sides thereof. A driving voltage Vd is applied to the power terminal $+V$ of the Hall element HS1 on the plus side thereof from the power device 35 through the connector cable 22. The power terminal $-V$ of the Hall element HS10 on the minus side thereof is connected onto a ground side of the power device 35 through the connector cable 33.

Outputs $+E$ and $-E$ of the Hall elements HS1 to HS10 are respectively transmitted to input terminals of differential amplifiers DF1 to DF10. The differential amplifiers DF1 to DF10 output detecting signals SS1 to SS10 corresponding to magnetic field intensities detected by the respective Hall elements HS1 to HS10. These detecting signals SS1 to SS10 are transmitted to the measuring device 34 through the connector cable 33.

In the measuring device 34, the detecting signals SS1 to SS10 are respectively transmitted to variable gain amplifiers AG1 to AG10 through the connector cable 33. Outputs of these variable gain amplifiers AG1 to AG10 are respectively transmitted to the test pins TP1 to TP10 as measuring signals SA1 to SA10.

Variable resistors VR1 to VR10 are used as feedback resistors of the variable gain amplifiers AG1 to AG10. Resistance values of these variable resistors VR1 to VR10 are changed by the thumbscrews NB1 to NB10.

When the distribution of a magnetic field of the magnetic head is measured in the above magnetic field measuring apparatus, respective measured voltage values of the measuring signals are corrected before this measurement.

Figure 12:
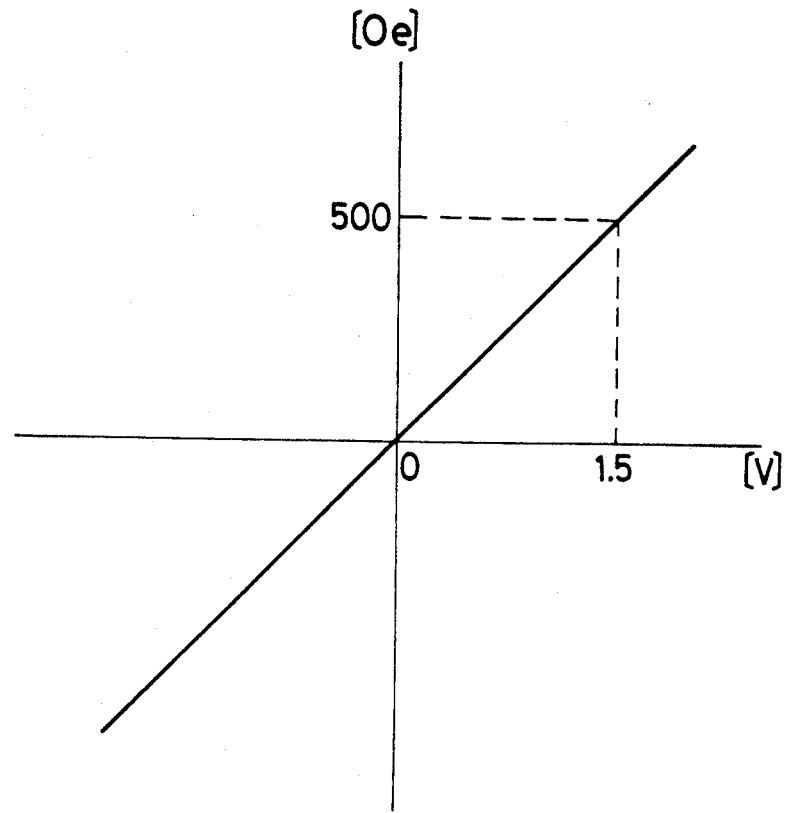
FIG. 12 is a graph showing a correction example of magnetic field intensity of a Hall element with respect to a voltage.

Namely, the circuit substrate 32 is detached from the dummy cartridge 30 and the Hall element array 31 is arranged in a known magnetic field. The thumbscrews NB1 to NB10 are operated to correct voltage values of the respective measuring signals SA1 to SA10 such that the voltage values of the measuring signals SA1 to SA10 obtained from the test pins TP1 to TP10 in the above arrangement provide a predetermined relation while voltages of the test pins TP1 to TP10 are measured by a voltmeter. For example, as shown in FIG. 12, this relation is set by adjusting the thumbscrews such that the voltage values are equal to 1.5 (V) when the magnetic field intensity is equal to 500 (Oe).

Figure 13:
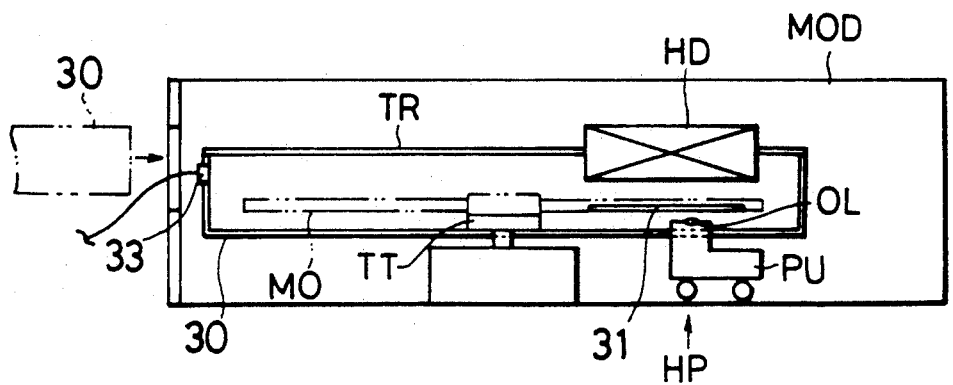
FIG. 13 is a schematic partial cross-sectional view for explaining a magnetic field measuring operation of the magnetic field measuring apparatus.

When the voltage values of the measuring signals SA1 to SA10 are completely corrected, the circuit substrate 32 is attached to the dummy cartridge 30 and this dummy cartridge 30 is mounted to a magnetooptic disk drive unit MOD. Thus, as shown in FIG. 13, the dummy cartridge 30 is positioned in a predetermined position of the magnetooptic disk drive unit MOD.

In this state, the Hall element array 31 is located at the same height as a recording face of a magnetooptic disk MO fixed to a turn table TT when the disk cartridge is mounted to the magnetooptic disk drive unit MOD. Further, the Hall element array 31 is located in a magnetic acting range of a magnetic head HD.

In this state, an operator first operates an unillustrated control unit for controlling an operation of the magnetooptic disk drive unit MOD such that the magnetic head HD is operated to generate a magnetic field.

Next, the operator sequentially measures voltage values of the test pins TP1 to TP10 by a voltmeter to measure respective voltage values of the measuring signals SA1 to SA10.

When the voltage values of the measuring signals SA1 to SA10 are thus obtained, the operator judges the distribution of a magnetic field of the magnetic head HD applied onto the recording face of the magnetooptic disk MO based on these obtained voltage values.

When the magnetic field distribution is obtained by this measurement, a well-known operation of the measuring apparatus is performed on the basis of this magnetic field distribution.

As mentioned above, in this embodiment, the magnetic field distribution of the magnetic head HD is measured in a state in which the magnetic head is attached to the magnetooptic disk drive unit MOD, thereby greatly simplifying a measuring operation of the magnetic field distribution. Further, the magnetic field distribution can be reliably measured since no operation of the measuring apparatus is almost influenced by an external factor.

As mentioned above, in accordance with the present invention, the measuring operation of the measuring apparatus is very simplified since a sensor for measuring an optical output and a magnetic field is attached to the measuring apparatus by mounting a dummy cartridge thereto. Further, it is not necessary to disassemble an optical disk drive unit and a magnetooptic disk drive unit. Accordingly, it is possible to reduce the number of operations at a measuring time of the measuring apparatus. Further, it is possible to provide reliable measured values of the optical output and the magnetic field since no operation of the measuring apparatus is influenced by disturbance light, an external magnetic field, etc.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for measuring an optical output of an optical pickup device disposed in an optical disk drive unit, said apparatus comprising:
   a dummy cartridge approximately of the same type as a disk cartridge to be mounted to said optical disk drive unit;
   a light-receiving element disposed in a predetermined position on said dummy cartridge for sensing said optical output of said optical pickup device and generating a light-receiving signal corresponding to the sensed optical output; and
   displaying means for receiving said light receiving signal related to said sensed optical output from said light-receiving element and for displaying a value of said sensed optical output.

2. An apparatus for measuring an optical output of an optical pickup device disposed in an optical disk drive unit as claimed in claim 1, said measuring apparatus further comprising:
   means for controlling the optical disk drive unit to cause the optical disk drive unit to perform a predetermined operation related to measuring the optical output of said optical pickup device.

3. A measuring apparatus as claimed in claim 2, wherein the measuring apparatus further comprises connector means for externally outputting the light-receiving signal of the light-receiving element and the optical level measuring display means receives the light-receiving signal generated by the light-receiving element through the connector means.

4. A measuring apparatus as claimed in claim 3, wherein the optical output is measured by mounting the dummy cartridge to the optical disk drive unit.

5. A measuring apparatus as claimed in claim 2, wherein the apparatus is operated by mounting the dummy cartridge to the optical disk drive unit.

6. A method of adjusting an optical pickup device of an optical disk drive unit such that an output level of a laser beam of the optical pickup device is equal to a predetermined level during recording and reproducing of data, comprising the steps of:
   measuring the output level of the laser beam using the apparatus recited in claim 1; and
   correcting the optical pickup device so that the measured output level of the laser beam is equal to the predetermined level.

7. An apparatus according to claim 1, wherein said displaying means is disposed independently of said dummy cartridge and is coupled to said light-receiving element by a connector.

8. An apparatus according to claim 1, wherein said displaying means is disposed on said dummy cartridge so as to be observed from outside said optical disk drive unit when said dummy cartridge is mounted into said optical disk drive unit.

9. An apparatus for measuring a magnetic field of a magnetic head disposed in a magnetooptic disk drive unit for generating an auxiliary magnetic field, said apparatus comprising:
   a dummy cartridge approximately of the same type as a disk cartridge to be mounted to said magnetooptic disk drive unit;
   at least one magnetic field detecting element disposed in a predetermined position on said dummy cartridge for detecting said magnetic field of said magnetic head and generating a detecting signal corresponding to the detected magnetic field; and
   displaying means for receiving said detecting signal corresponding to the detected magnetic field magnetic field from said at least one magnetic detecting element and for displaying a value of said detected magnetic field.

10. An apparatus for measuring a magnetic field distribution of a magnetic head disposed in a magnetooptic disk drive unit for generating an auxiliary magnetic field as claimed in claim 9, said measuring apparatus further comprising:
    means for controlling the magnetooptic disk drive unit to cause the magnetooptic disk drive unit performs a predetermined operation related to measuring the magnetic field.

11. A measuring apparatus as claimed in claim 10, wherein the measuring apparatus further comprises connector means for externally outputting the detecting signal of the magnetic field detecting element and the magnetic field measuring display means receives the detecting signal generated by said at least one detecting element through the connector means.

12. A measuring apparatus as claimed in claim 11, wherein the magnetic field is measured by mounting the dummy cartridge to the magnetooptic disk drive unit.

13. A measuring apparatus as claimed in claim 11, wherein the magnetic field distribution is measured in a state in which the magnetic head is attached to the magnetooptic disk drive unit.

14. A measuring apparatus as claimed in claim 10, wherein the measuring apparatus is operated by mounting the dummy cartridge to the magnetooptic disk drive unit.

15. A measuring apparatus as claimed in claim 10, wherein the magnetic field distribution of the magnetic head is measured in a state in which the magnetic head is attached to the magnetooptic disk drive unit.

16. An apparatus according to claim 9, wherein said displaying means is disposed independently of said dummy cartridge and is coupled to said at least one magnetic field detecting element by a connector.

17. An apparatus according to claim 16, wherein said apparatus comprises a plurality of magnetic field detecting elements arranged in a line along a radial direction of said dummy cartridge.

18. An apparatus according to claim 9, wherein said displaying means is disposed on said dummy cartridge so as to be observed from outside said magnetooptic disk drive unit when said dummy cartridge is mounted into said magnetooptic disk drive unit.

19. An apparatus according to claim 18, wherein said apparatus comprises a plurality of magnetic field detecting elements arranged in a line along a radial direction of said dummy cartridge.

20. A method of measuring at least one of: (i) an optical output of an optical pickup device disposed in an optical disk drive unit; and (ii) and a magnetic field distribution of a magnetic head disposed in a magnetooptic disk drive unit, said method comprising:

coupling a dummy cartridge in the disc drive unit in a manner corresponding to that in which a disc cartridge is coupled with the disc drive for the normal operation of the disc drive unit to read information from or record information on the disc cartridge;

including in said dummy cartridge at least one of: (i) a light-receiving element for detecting said optical output of said optical pickup device and generating a light-receiving signal; and; (ii) a magnetic field detecting element for detecting the magnetic field of said magnetic head and generating a magnetic detecting signal;

coupling a display device with said dummy cartridge to receive at least one of said light-receiving signal and said magnetic detecting signal and to display a measured value of the received signal; and controlling the disk drive unit to cause the unit to carry out a selected operation related to measuring at least one of said optical output of said optical pickup device and said magnetic field distribution of said magnetic head.

* * * * *